Oct. 8, 1946.  R. L. HARRAL  2,409,123
COMBINATION CULTIVATOR AND ROW THINNER
Filed April 5, 1945  2 Sheets-Sheet 1
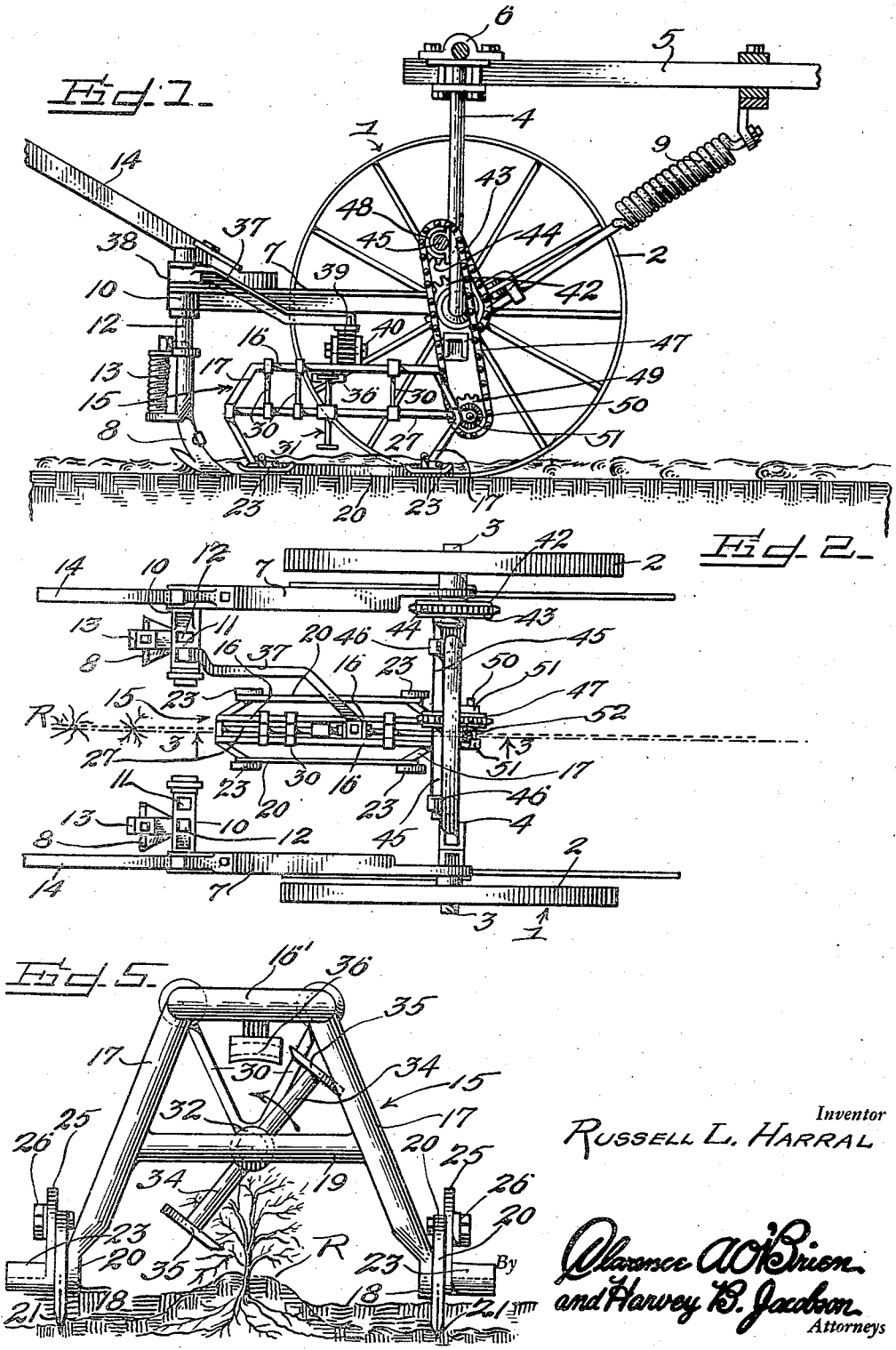
Inventor
RUSSELL L. HARRAL
By Clarence A. O'Brien
and Harvey B. Jacobson
Attorneys Oct. 8, 1946.　　　　R. L. HARRAL　　　　2,409,123
COMBINATION CULTIVATOR AND ROW THINNER
Filed April 5, 1945　　　　2 Sheets-Sheet 2
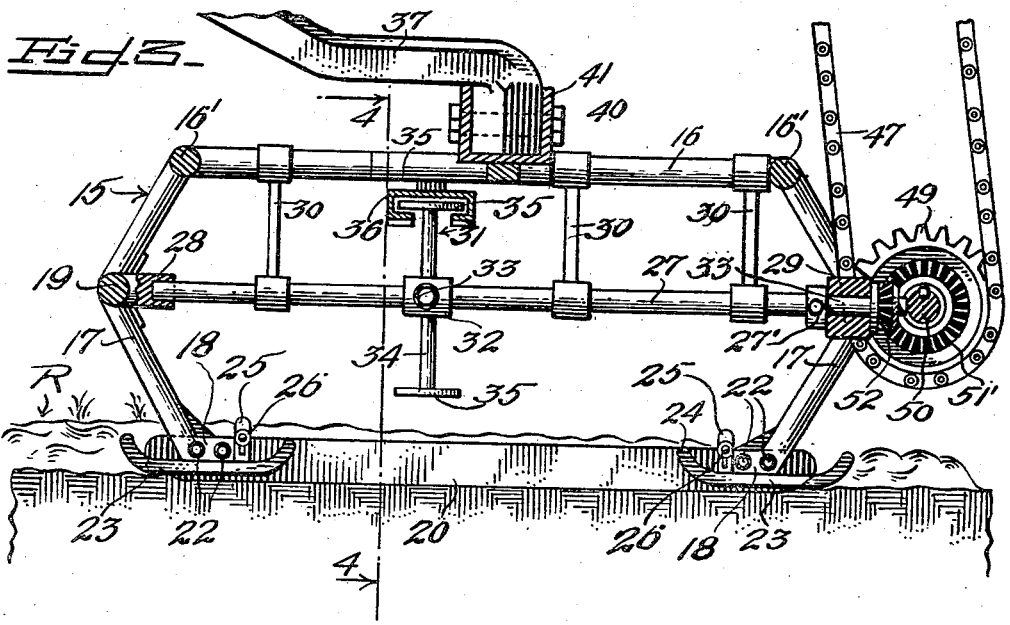
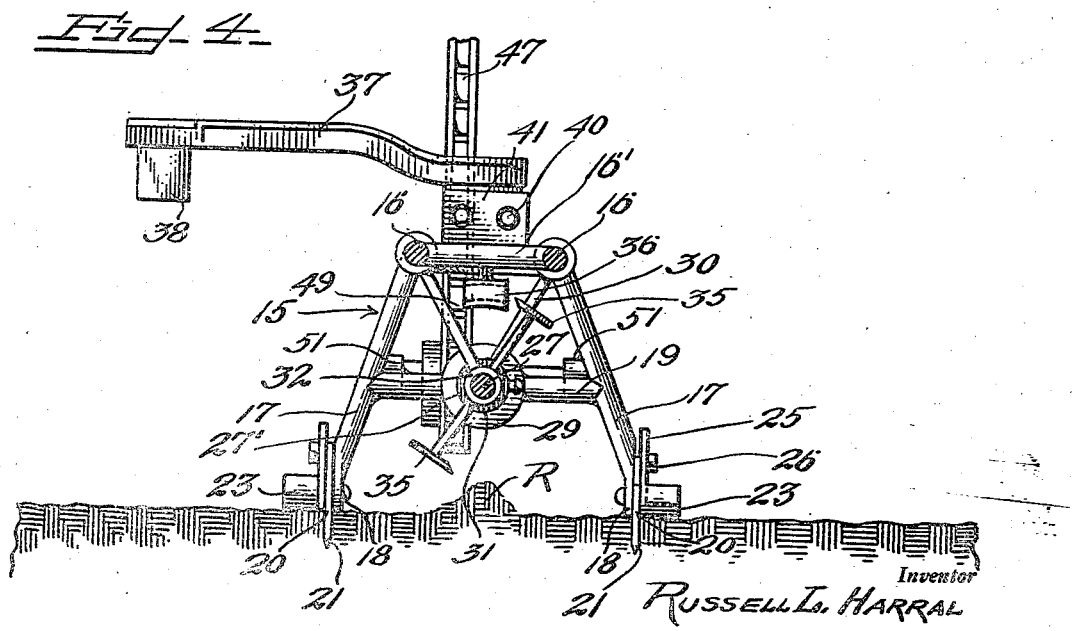

Patented Oct. 8, 1946

2,409,123

UNITED STATES PATENT OFFICE 2,409,123

COMBINATION CULTIVATOR AND ROW THINNER

Russell L. Harral, Jonesboro, Ark.

Application April 5, 1945, Serial No. 586,692

5 Claims. (Cl. 97—12)

My invention relates to improvements in combination cultivators and row thinners for cultivating and thinning row crops.

The primary object of my invention is to equip a cultivator, or plow, of the wheel-supported, straddle-row type, with efficient mechanism of simple form and inexpensive construction operative, as the cultivator, or plow, travels along the rows, to thin out the rows and hoe the same crosswise, whereby time and labor may be saved in thinning out and hoeing rows crops.

Another object is to provide mechanism for the purpose above set forth adapted for attachment to wheel-supported, straddle-row cultivators of commerce without necessitating extensive alteration in the cultivators, and which may be readily detached when it is desired to use the cutivator alone.

Other and subordinate objects, also comprehended by my invention, together with the precise nature of my improvements and the manifold advantages thereof, will be readily understood when the succeeding description and claims are read with reference to the drawings accompanying and forming part of this specification.

In said drawings:

Figure 1 is a view in vertical longitudinal section illustrating my invention in a preferred embodiment thereof, Figure 2 is a view in plan, Figure 3 is a detail view in longitudinal vertical section taken on the line 3—3 of Figure 2 and drawn to an enlarged scale, Figure 4 is a view in transverse section taken on the line 4—4 of Figure 3, Figure 5 is a view in rear elevation of the skid frame and parts carried thereby drawn to a further enlarged scale.

Reference being had to the drawings by numerals, my invention has been shown therein, in illustrating a preferred embodiment thereof, as forming part of the equipment of a wheel-supported, straddle-row cultivator of commerce which need merely be described briefly, since such cultivators are well known and understood in the art.

The cultivator 1 comprises a pair of ground wheels 2 rotatably mounted on stub axles 3 of an upwardly arched axle bar 4 from the upper and central portion of which a draft tongue 5 extends forwardly and is pivotally attached thereto, as represented at 6. A pair of cultivator-carrying beams 7 extend rearwardly from the axles 3 with front ends thereof pivotally mounted, in a manner which will be understood, on said axles so that the beams 7 may be swung upwardly to lift the cultivator shovels 8 out of the ground as occasion may require. The tongue 5 is connected to the beams 7 by evener means including springs 9 tending to swing said beams downwardly to facilitate cultivating, as will be understood. The beams 7 are provided with inwardly extending rear end crossheads 10 having longitudinally spaced square sockets 11 therein for receiving the shanks 12 of the cultivator shovels 8, which shanks may be selectively fixed in said sockets to vary the spacing between the shovels 8. The shovels 8 are mounted on the shanks 12 by the usual spring trip rigs indicated at 13. The beams 7 carry the usual handles 14.

According to my invention, a skid frame 15 is provided between the beams 7 to straddle a row, as illustrated in Figure 5, straddled by the cultivator 1, said frame being of elongated form and arranged to travel endwise with its rear end spaced forwardly of the cultivator shovels 8 and its front end substantially in vertical alignment with the axle bar 4 for a purpose presently seen. The skid frame 15 may take various forms, but is preferably of rod-like skeleton construction with a pair of closely spaced top, longitudinally extending members 16 connected by horizontal end cross members 16' from which depend front and rear pairs of downwardly diverging terminal legs 17 for straddling a row R and which terminate in flattened vertical lower end ears 18 and are connected intermediate their ends by a pair of front and rear cross members 19. A pair of longitudinally extending guards 20 of knife blade form with lower knife edges 21 are bolted to the ears 18, as at 22, to extend along opposite sides of the frame 15 in straddling relation to the row R. Front and rear pairs of short skids, or runners, 23 are provided at the front and rear ends of the frame 15 for riding along the ground above the knife edges 21 of the guards 20, said skids 23 having upturned ends 24 to facilitate travel of the skids over the ground and being adjustably secured to the guards 20 by upstanding lugs 25 on said skids and bolt and slot connections 26 for attaching said lugs 25 to said guards 20 so that the skids 23 may be adjusted vertically for a purpose presently seen.

A driven shaft 27 extends horizontally and centrally through the frame 15 in the longitudinal center thereof with its rear end mounted in a suitable bearing 28 on the cross member 19 at the rear end of the frame 15, and its front end extending through a suitable bearing 29 on the cross member 19 at the front end of said frame. V-shaped bearings 30 depend from the members 16 at suitable points and support said shaft 27 intermediate the ends of the shaft. A set collar 27' on the shaft 27 behind the bearing 29 prevents forward movement of said shaft 27 in its bearings. A revolving thinner hoe 31 is mounted on the shaft 27 at any suitable location on said shaft and which comprises a hub 32 adapted to be fixed to said shaft 27 by a set bolt 33, a pair of diametrically opposite spider arms 34 extending from said hub 32 and terminating in a pair of hoe blades 35 of flat form and disposed crosswise of said arms 34. Above the hoe 31 a suitable channel-type cleaner 36 for the hoe blades 35 is mounted on the members 16 in any suitable manner, the arrangement being such that said blades 35 revolve through said cleaner 36 and accumulated earth caked on the hoe blades 35 is scraped off the same by said cleaner 36.

The described frame 15, with the parts carried thereby, is designed to be detachably attached to one of the crossheads 10 and to be pushed along the ground by means of a pusher arm 37 having a depending rear end, square stud 38 slidably fitting downwardly in one of the sockets 11 of said arm 10 and a depending front end head 39 secured by means of bolts 40 in a channeled member 41 extending crosswise of the members 16 and suitably secured on top thereof in the transverse center of the frame 15. The pusher arm 37 is of suitably angular form to dispose the head 39 in the median plane of the frame 15 for a purpose which will be apparent.

A drive is provided between one of the ground wheels 2 and the driven shaft 27 comprising the following: A sprocket wheel 42 is suitably fixed on the hub of said ground wheel 2 and connected by a sprocket chain 43 with a smaller sprocket wheel 44 fast on one end of a shaft 45 extending crosswise of the yoke part of the axle bar 4 and journaled in suitable bearings 46 on said bar. A sprocket chain 47 extends from a sprocket wheel 48 fast on the shaft 45 to a sprocket wheel 49 fast on a cross shaft 50 journaled in forwardly extending arms 51 on the frame 15. The sprocket wheel 49 is provided with an internal bevel gear 51' meshing with a relatively smaller bevel gear 52 fast on the front end of the driven shaft 27 in front of the bearing 29. In connection with the described drive, it is within the purview of my invention to utilize different sizes of sprocket wheels 48 on the shaft 45 and vary the length of the sprocket chain 47 accordingly to change the ratio of drive to the driven shaft 27, as may be required, so that the described hoe 31 will perform its thinning and hoeing operations at close-together or far-apart intervals as the cultivator 1 travels over the row R.

Referring now to the use and operation of the described invention. As the cultivator 1 travels forwardly, the frame 15 is pushed along the ground by the pusher arm 37 and supported by the skids 23, with the guards 29 penetrating the ground on each side of the row R. The hoe 31 is revolved in the direction indicated by the arrow in Figure 5 to thin out the plants in the row R, the hoe blades 35 cutting off the plants at spaced intervals below the ground or earth and performing a hoeing operation at the same time. The guards 29 prevent ground or earth thrown by the hoe blades 35 from being scattered over adjacent rows and by confining such ground or earth therebetween. The depth at which the hoe blades 35 will cut and hoe may be regulated by adjusting the skids 23, in the manner already described. As will be understood, the skids 23 are adapted to engage the ground when the cultivator shovels 8 have penetrated the ground. In this connection, and by virtue of the sliding fit of the stud 38 in the socket 11, the frame 15 may ride up and down a limited distance as operating requirements may obtain. Also, the frame 15 may be lifted off the ground when the beam 7 to which it is connected, or attached, is swung upwardly and lowered with said beam 7 so that the hoe 31 assumes operating position along with the cultivator shovel 8. By disconnecting the sprocket chain 47 and lifting the stud 38 out of its socket 11, the frame 15 and parts carried thereby may be detached from the cultivator 1.

The foregoing will, it is believed, suffice to impart a clear understanding of my invention without further explanation.

Manifestly, the invention, as described, is susceptible of modification both as regards details of construction and combinations of parts, without departing from the inventive concept, and right is herein reserved to such modifications as fall within the scope of the appended claims.

What I claim is:

1. The combination with a wheel-supported straddle-row cultivator including a pair of trailing shovel-carrying beams, of a skid frame intermediate said beams for straddling a row being cultivated and adapted to travel over the ground, ground-engaging skids on said frame for supporting the same, a combined row-thinning and hoeing element mounted in said frame to travel over the row and be revolved crosswise of the row, means to revolve said element operative by a wheel of the cultivator, and means to detachably attach said frame to one of said beams to travel in advance of the shovel carried by the beam.

2. The combination with a wheel-supported straddle-row cultivator including a pair of trailing shovel-carrying beams, of a skid frame intermediate said beams for straddling a row being cultivated and adapted to travel over the ground, ground-engaging skids on said frame for supporting the same, a combined row-thinning and hoeing element mounted in said frame to travel over the row and be revolved crosswise of the row, means to revolve said element operative by a wheel of the cultivator, means to detachably attach said frame to one of said beams to travel in advance of the shovel carried by the beam, and a pair of guards on opposite sides of said frame for confining therebetween earth thrown by said element.

3. The combination with a wheel-supported straddle-row cultivator including a pair of trailing shovel-carrying beams, of a skid frame intermediate said beams for straddling a row being cultivated and adapted to travel over the ground, ground-engaging skids on said frame for supporting the same, a combined row-thinning and hoeing element mounted in said frame to travel over the row and be revolved crosswise of the row, means to revolve said element operative by a wheel of the cultivator, means to detachably attach said frame to one of said beams to travel in advance of the shovel carried by the beam, and means on said frame for cleaning said element as the element revolves.

4. The combination with a wheel-supported straddle-row cultivator including a pair of trailing shovel-carrying beams, of a skid frame intermediate said beams for straddling a row being cultivated and adapted to travel over the ground, ground-engaging skids on said frame for supporting the same, a combined row-thinning and hoeing element mounted in said frame to travel over the row and be revolved crosswise of the row, means to revolve said element operative by a wheel of the cultivator, and means to detachably attach said frame to one of said beams to travel in advance of the shovel carried by the beam, the last-mentioned means comprising a pusher arm detachably connected at one end to said beam against swinging sidewise and having the other end thereof connected to said frame.

5. The combination with a wheel-supported straddle-row cultivator including a pair of trailing shovel-carrying beams, of a skid frame intermediate said beams for straddling a row being cultivated and adapted to travel over the ground, ground-engaging skids on said frame for supporting the same, a combined row-thinning and hoeing element mounted in said frame to travel over the row and be revolved crosswise of the row, means to revolve said element operative by a wheel of the cultivator, means to detachably attach said frame to one of said beams to travel in advance of the shovel carried by the beam, and a pair of guards on opposite sides of said frame for confining therebetween earth thrown by said element, said guards comprising bars having cutting edges depending below said skids to penetrate the ground.

RUSSELL L. HARRAL.